United States Patent
Lin

(10) Patent No.: US 11,632,726 B2
(45) Date of Patent: Apr. 18, 2023

(54) METHOD AND APPARATUS FOR WI-FI NETWORK PROCESSING, ELECTRONIC DEVICE, AND STORAGE MEDIUM

(71) Applicants: SHENZHEN HEYTAP TECHNOLOGY CORP., LTD., Guangdong (CN); GUANGDONG OPPO MOBILE TELECOMMUNICATIONS CORP., LTD., Guangdong (CN)

(72) Inventor: Jinquan Lin, Guangdong (CN)

(73) Assignees: SHENZHEN HEYTAP TECHNOLOGY CORP., LTD., Shenzhen (CN); GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 188 days.

(21) Appl. No.: 17/345,491

(22) Filed: Jun. 11, 2021

(65) Prior Publication Data
US 2021/0306963 A1    Sep. 30, 2021

Related U.S. Application Data

(63) Continuation of application No. PCT/CN2018/121296, filed on Dec. 14, 2018.

(51) Int. Cl.
*H04B 17/10* (2015.01)
*H04B 17/327* (2015.01)
(Continued)

(52) U.S. Cl.
CPC .......... *H04W 52/54* (2013.01); *H04B 17/103* (2015.01); *H04B 17/327* (2015.01);
(Continued)

(58) Field of Classification Search
CPC .. H04B 17/318; H04B 17/327; H04B 17/103; H04W 52/143; H04W 52/10; H04W 52/54
See application file for complete search history.

(56) References Cited

U.S. PATENT DOCUMENTS

| 8,929,490 B1 | 1/2015 | Fernandes Barros |
| 2014/0323087 A1 | 10/2014 | Huang et al. |

FOREIGN PATENT DOCUMENTS

| CN | 102497659 A | 6/2012 |
| CN | 102917424 A | 2/2013 |
| (Continued) | | |

OTHER PUBLICATIONS

International search report with English Translation issued in PCT/CN2018/121296 dated Sep. 5, 2019.
(Continued)

*Primary Examiner* — James P Duffy
(74) *Attorney, Agent, or Firm* — Young Basile Hanlon & MacFarlane, P.C.

(57) ABSTRACT

Described herein are a method and apparatus for Wi-Fi network processing, an electronic device, and a storage medium. In response to detecting a Wi-Fi signal, signal energy of the Wi-Fi signal is obtained. In response to the signal energy being greater than a first energy threshold, a correlation degree between the Wi-Fi signal and a preset Wi-Fi signal is obtained. In response to the signal energy being greater than the first energy threshold and less than a second energy threshold and the correlation degree is greater than a first correlation degree threshold, the Wi-Fi signal is demodulated. In response to the signal energy being not less than the second energy threshold and the correlation degree is greater than a second correlation degree threshold, the Wi-Fi signal is demodulated.

20 Claims, 5 Drawing Sheets

(51) Int. Cl.
  *H04W 52/54* (2009.01)
  *H04W 52/10* (2009.01)
  *H04W 52/14* (2009.01)
  *H04W 72/044* (2023.01)

(52) U.S. Cl.
  CPC ......... *H04W 52/10* (2013.01); *H04W 52/143* (2013.01); *H04W 72/0473* (2013.01)

(56) References Cited

FOREIGN PATENT DOCUMENTS

| CN | 103581979 A | 2/2014 |
| CN | 107147453 A | 9/2017 |
| JP | 2013070421 A | 4/2013 |
| JP | 2017533618 A | 11/2017 |
| KR | 20170028894 A | 3/2017 |
| WO | 0071056 A1 | 11/2000 |
| WO | 2000071056 A1 | 11/2000 |
| WO | 2011109073 A1 | 9/2011 |
| WO | 2015058502 A1 | 4/2015 |
| WO | 2016006311 A1 | 1/2016 |
| WO | 2016006312 A1 | 1/2016 |
| WO | 2016197460 A1 | 12/2016 |
| WO | 2017222837 A1 | 12/2017 |
| WO | 2018214871 A1 | 11/2018 |

OTHER PUBLICATIONS

Extended European Search Report for EP Application 18942834.5 dated Nov. 18, 2021. (8 pages).
Chinese First Office Action with English Translation for CN Application 201880098838.5 dated Apr. 15, 2022. (9 pages).
Japanese Office Action with English Translation for JP Application 2021534288 dated May 25, 2022. (6 pages).
Indian First Examination Report for IN Application 202117029171 dated Aug. 30, 2022. (6 pages).
Chinese Notification to Grant Patent Right for Invention with English Translation for CN Application 201880098838.5, dated Sep. 28, 2022. (8 pages).
Korean Office Action with English Translation for KR Application 1020217019647 dated Oct. 27, 2022. (10 pages).

METHOD AND APPARATUS FOR WI-FI NETWORK PROCESSING, ELECTRONIC DEVICE, AND STORAGE MEDIUM

CROSS-REFERENCE TO RELATED APPLICATION(S)

This application is a continuation of International Application No. PCT/CN2018/121296, filed on Dec. 14, 2018, the entire disclosures of which is incorporated herein by reference.

TECHNICAL FIELD

This disclosure relates to the field of wireless network technology, and particularly to a method and an apparatus for Wi-Fi network processing, an electronic device, and a storage medium.

BACKGROUND

With a continuous development of science and technology, more and more electronic devices can access a network through Wireless Fidelity (Wi-Fi); moreover, there are a large number of Wi-Fi signals in many public places, and the electronic devices can be seriously interfered during processing the Wi-Fi signals.

SUMMARY

In view of the above problems, implementations of the present disclosure provide a method and an apparatus for Wi-Fi network processing, an electronic device, and a storage medium.

In a first aspect, implementations of the present disclosure provide a method for Wi-Fi network processing, which is for an electronic device. The method includes the following. Signal energy of a Wi-Fi signal is obtained in response to detecting the Wi-Fi signal. A correlation degree between the Wi-Fi signal and a preset Wi-Fi signal is obtained in response to the signal energy being greater than a first threshold energy. In response to the signal energy being greater than the first threshold energy and less than a second threshold energy and the correlation degree being greater than a first correlation degree threshold, the Wi-Fi signal is demodulated, the first threshold energy being less than the second threshold energy. In response to the signal energy being not less than the second threshold energy and the correlation degree being greater than a second correlation degree threshold, the Wi-Fi signal is demodulated, the first correlation degree threshold being greater than the second correlation degree threshold.

In a second aspect, implementations of the present disclosure provide an electronic device, which includes a memory, one or more processors coupled to the memory, and one or more programs. The one or more application programs are stored in the memory and configured to be executed by the one or more processors. The one or more programs are configured to execute all or part of operations of the method in the first aspect.

In a third aspect, implementations of the present disclosure provide a non-transitory computer readable storage medium for storing program codes. The program codes are called by a processor to execute all or part of operations of the method in the first aspect.

BRIEF DESCRIPTION OF DRAWINGS

To describe technical solutions in implementations of the present disclosure more clearly, the following briefly introduces accompanying drawings required for illustrating the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

In order to make those skilled in the art better understand the solution of the application, technical solutions in implementations of the present disclosure will be described clearly and completely hereinafter with reference to the accompanying drawings described.

With a development of the Internet and wireless networks, more and more people use Wi-Fi devices to access the network. Currently, there are a large number of wireless signals in many public places, and a large number of Wi-Fi signals, ranging from a few to dozens in number, can be scanned out once electronic devices turn on Wi-Fi switches and perform scanning. These Wi-Fi signals are arranged from front to back in an order in accordance with their signal quality. A problem caused by so many Wi-Fi signals is strong interference.

A Wi-Fi module of the electronic device will process the Wi-Fi signals scanned by the electronic device when it works, and the Wi-Fi signals processed by the electronic device include high-signal-quality signals, low-signal-quality signals, long-distance signals, and short-distance signals, etc. Therefore, due to processing invalid packets for a long time, power consumption of the electronic device will be increased, and overall Wi-Fi performance will be poor.

In view of the above problems, the inventor discovered through a long-term research and proposed a method and an apparatus for Wi-Fi network processing, an electronic device and a storage medium provided in implementations of the present disclosure, in which signal energy of the Wi-Fi signal can be compared with a first energy threshold and a second energy threshold respectively, a correlation degree between a Wi-Fi signal and a preset Wi-Fi signal can be compared with a first correlation degree threshold and a second correlation degree threshold respectively, so as to select the Wi-Fi signal for demodulation, thus improving anti-interference ability and Wi-Fi performance of the electronic device. The method for Wi-Fi network processing will be described in detail in subsequent implementations.

Implementations

Figure 1:
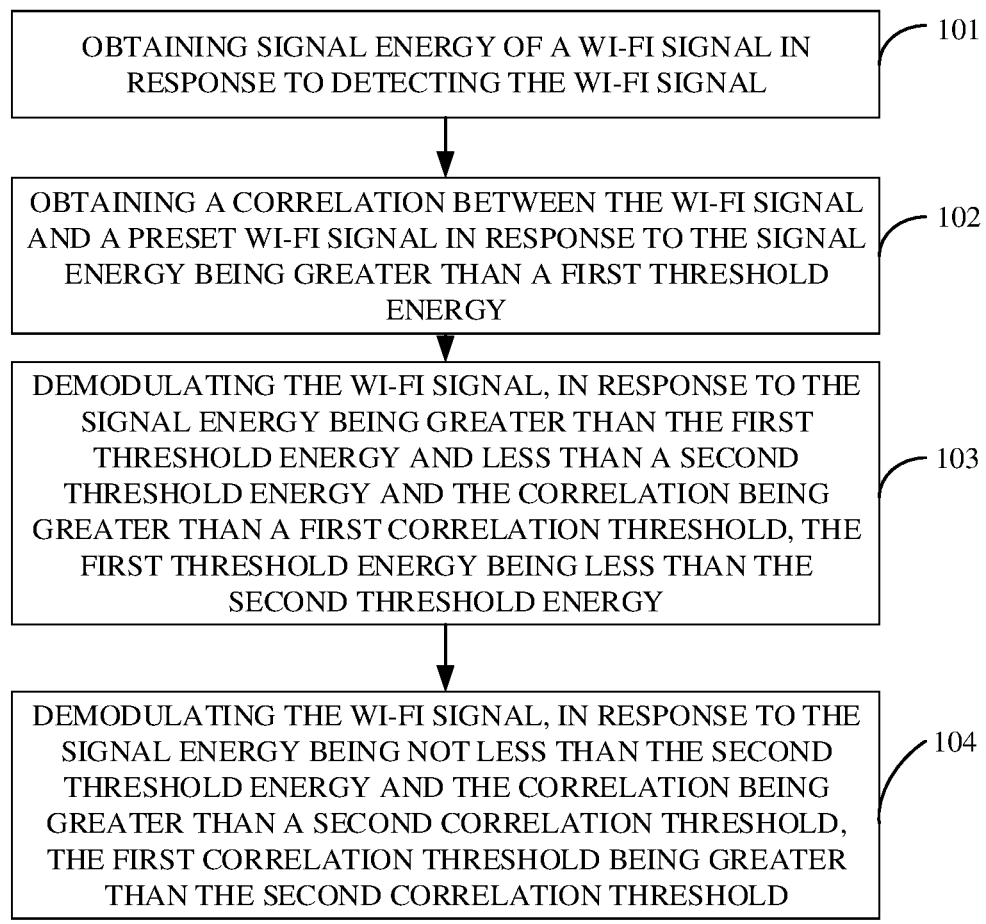
FIG. 1 is a schematic flowchart illustrating a method for Wi-Fi network processing according to implementations of the present disclosure.

Now reference is made to FIG. 1, which is a schematic flowchart illustrating a method for Wi-Fi network processing according to implementations of the present disclosure. In the method for Wi-Fi network processing, the signal energy of the Wi-Fi signal is compared with the first energy threshold and the second threshold energy respectively, the correlation degree between the Wi-Fi signal and the preset Wi-Fi signal is compared with the first correlation degree threshold and the second correlation degree threshold respectively, so as to select the Wi-Fi signal for demodulation, thus improving the anti-interference ability and Wi-Fi performance of the electronic device. In specific implementations, the method for Wi-Fi network processing is applied to an apparatus for Wi-Fi network processing 900 illustrated in FIG. 9 and the electronic device 100 (illustrated in FIG. 10) equipped with the apparatus for Wi-Fi network processing 900. Flow of implementations will be explained specifically below by taking the electronic device as an example. It can be understood that the electronic device used in the implementations can include a smart phone, a tablet computer, a wearable electronic device or the like, which is not specifically limited herein. The flowchart as illustrated in FIG. 1 will be described in detail below, and the method for Wi-Fi network processing can specifically include following operations at block 101 to block 104.

At block 101, in response to detecting, by an electronic device, a Wi-Fi signal, signal energy of the Wi-Fi signal is obtained.

In this implementation, when the electronic device receives instruction information for instructing to turn on a Wi-Fi switch, the Wi-Fi signal in an environment in which the electronic device is located is detected in response to the instruction information. The instruction information can be generated when the user manually touches a Wi-Fi switch control, can be generated when a voice instruction for instructing to turn on the Wi-Fi switch is received, or can be generated when a preset turning-on rule is met, for example, when a certain time point is reached, which is not limited herein. In addition, upon receiving the instruction information, the electronic device can scan the Wi-Fi signal based on the instruction information. Generally, the electronic device can send broadcast information and obtain the Wi-Fi signal in the environment based on the broadcast information.

Further, the electronic device obtains the signal energy of the detected Wi-Fi signal, which refers to a corresponding Wi-Fi signal energy of the Wi-Fi module when the electronic device detects the Wi-Fi signal. It can be understood that the signal energy of the Wi-Fi signal can be used to indicate a Wi-Fi state, that is, different signal energy of the Wi-Fi signal corresponds to different states of the Wi-Fi. For example, the electronic device is connected with a wireless access point (AP), and the electronic device is connected to the Internet through the wireless AP, so that the electronic device can visit the Internet. The electronic device and the wireless AP can interact through a Wi-Fi connection. However, when the electronic device is away from the wireless AP, the signal energy of the Wi-Fi signal sent by the wireless AP is weak in an area where the electronic device is located, which will lead to poor quality of the Wi-Fi signal received by the electronic device and an unstable network status. Therefore, the electronic device can obtain the signal energy of the detected Wi-Fi signal and determine whether to process the Wi-Fi signal based on the signal energy.

At block 102, in response to the signal energy being greater than a first threshold energy, a correlation degree between the Wi-Fi signal and a preset Wi-Fi signal is obtained.

The first threshold energy is set by the electronic device. For example, a first receive (RX) packet detect (PD) threshold is set. The first threshold energy is configured as a basis for determining the signal energy of the Wi-Fi signal obtained by the electronic device. Specifically, after obtaining the signal energy of the Wi-Fi signal, the electronic device compares the signal energy with the first threshold energy to determine whether the signal energy is greater than the first threshold energy. In response to the signal energy being not greater than the first threshold energy, it is indicated that the signal energy of the Wi-Fi signal is weak, which will result in poor quality of the Wi-Fi signal received by the electronic device, poor network quality, and a waste of resources of the electronic device if the Wi-Fi signal is further processed. Therefore, this Wi-Fi signal can be filtered. Specifically, the Wi-Fi signal can be filtered before demodulation in a Wi-Fi baseband layer, thus reducing subsequent unnecessary decoding time and reducing power consumption of the electronic device.

On the contrary, in response to the signal energy being greater than the first threshold energy, it is indicated that the signal energy of the Wi-Fi signal is strong, so the Wi-Fi signal can be further processed. When the signal energy is determined to be greater than the first threshold energy, a correlation degree between the Wi-Fi signal and the preset Wi-Fi signal is obtained. Specifically, the electronic device stores a Wi-Fi signal as a preset Wi-Fi signal in advance. The preset Wi-Fi signal can be automatically set by the electronic device, manually set by the user, or transmitted to the electronic device after being set by a server, which is not limited herein. Therefore, in this implementation, after obtaining the Wi-Fi signal, the electronic device can compare the Wi-Fi signal with the preset Wi-Fi signal to obtain the correlation degree between the Wi-Fi signal and the preset Wi-Fi signal. The greater the correlation degree between the Wi-Fi signal and the preset Wi-Fi signal is, the more similar the Wi-Fi signal is to the preset Wi-Fi signal, and the better the quality of the Wi-Fi signal is. The less the correlation degree between Wi-Fi signal and preset Wi-Fi signal is, the less similar the Wi-Fi signal is to the preset Wi-Fi signal, and the worse the quality of the Wi-Fi signal is.

At block 103, in response to the signal energy being greater than the first threshold energy and less than a second threshold energy and the correlation degree being greater than the first correlation degree threshold, the Wi-Fi signal is demodulated. The first threshold energy is less than the second threshold energy.

In this implementation, the second threshold energy is further set in the electronic device, for example, a second RX PD threshold is set. The first threshold energy is less than the second threshold energy, and the second threshold energy can be configured as a basis for determining whether the signal energy of the Wi-Fi signal is stronger or not. Specifically, after determining that the signal energy of Wi-Fi signal is greater than the first threshold energy, the electronic device compares the signal energy with the second threshold energy to determine whether the signal energy is less than the second threshold energy. When the signal energy is less than the second threshold energy, it is indicated that the signal energy is greater than the first signal energy and less than the second signal energy, and at this time, it is indicated that the signal energy of Wi-Fi signal is strong.

Further, the first correlation degree threshold is further set in the electronic device. The first correlation degree threshold is configured as a basis for determining the correlation degree between the Wi-Fi signal obtained by the electronic device and the preset Wi-Fi signal. For example, the first correlation degree threshold can be configured as a basis for determining whether the correlation degree between the Wi-Fi signal and the preset Wi-Fi signal is stronger. Specifically, after obtaining the correlation degree between the Wi-Fi signal and the preset Wi-Fi signal, the electronic device compares the correlation degree with the first correlation degree threshold to determining whether the correlation degree is greater than the first correlation degree threshold. In response to the correlation degree being greater than the first correlation degree threshold, it is indicated that the correlation degree between the Wi-Fi signal and the preset Wi-Fi signal is stronger. Therefore, in response to the signal energy being greater than the first threshold energy and less than the second threshold energy and the correlation degree being greater than the first correlation degree threshold, it can be considered that the Wi-Fi signal is of strong signal energy and the correlation degree between the Wi-Fi signal and the preset Wi-Fi signal is stronger, which indicates the signal quality of the Wi-Fi signal is good, and the Wi-Fi signal can be demodulated.

At block 104, in response to the signal energy being not less than the second threshold energy and the correlation degree being greater than the second correlation degree threshold, the Wi-Fi signal is demodulated. The first correlation degree threshold is greater than the second correlation degree threshold.

In this implementation, the second correlation degree threshold is further set in the electronic device. The second correlation degree threshold is configured as a basis for determining the correlation degree between the Wi-Fi signal obtained by the electronic device and the preset Wi-Fi signal. The first correlation degree threshold is greater than the second correlation degree threshold, and the second correlation degree threshold can be configured as a basis for determining whether the correlation degree between the Wi-Fi signal and the preset Wi-Fi signal is strong. Specifically, after obtaining the correlation degree between the Wi-Fi signal and the preset Wi-Fi signal, the electronic device compares the correlation degree with the second correlation degree threshold to determine whether the correlation degree is greater than the second correlation degree threshold. When the correlation degree is not greater than the second correlation degree threshold, it is indicated that the correlation degree between the Wi-Fi signal and the preset Wi-Fi signal is weak, and the quality of the Wi-Fi signal is poor. Therefore, if the Wi-Fi signal is continued to be processed, the resources of electronic device will be wasted. Therefore, this Wi-Fi signal can be filtered. Specifically, the Wi-Fi signal can be filtered before demodulation in a Wi-Fi baseband layer, thus reducing subsequent unnecessary decoding time and reducing power consumption of the electronic device.

On the contrary, in response to the correlation degree being greater than the second correlation degree threshold, it is indicated that the correlation degree between the Wi-Fi signal and the preset Wi-Fi signal is strong. Therefore, in response to the signal energy being not less than the second threshold energy and the correlation degree being greater than the second correlation degree threshold, it can be considered that the signal energy of the Wi-Fi signal is stronger and the correlation degree between the Wi-Fi signal and the preset Wi-Fi signal is strong, and thus it is indicated that the quality of the Wi-Fi signal is good and the Wi-Fi signal can be demodulated.

According to the method for Wi-Fi network processing provided in implementations of the present disclosure, in response to detecting the Wi-Fi signal, the signal energy of the Wi-Fi signal is obtained, and in response to the signal energy being greater than the first energy threshold, the correlation degree between the Wi-Fi signal and the preset Wi-Fi signal is obtained. In response to the signal energy being greater than the first energy threshold and less than the second energy threshold and the correlation degree being greater than the first correlation degree threshold, the Wi-Fi signal is demodulated, the first energy threshold being less than the second energy threshold. In response to the signal energy being not less than the second energy threshold and the correlation degree being greater than the second correlation degree threshold, the Wi-Fi signal is demodulated, the first correlation degree threshold being greater than the second correlation degree threshold. In this way, the signal energy of the Wi-Fi signal can be compared with the first energy threshold and the second energy threshold respectively, the correlation degree between the Wi-Fi signal and the preset Wi-Fi signal can be compared with the first correlation degree threshold and the second correlation degree threshold respectively, so as to select the Wi-Fi signal for demodulation, thus improving anti-interference ability and Wi-Fi performance of the electronic device.

Figure 2:
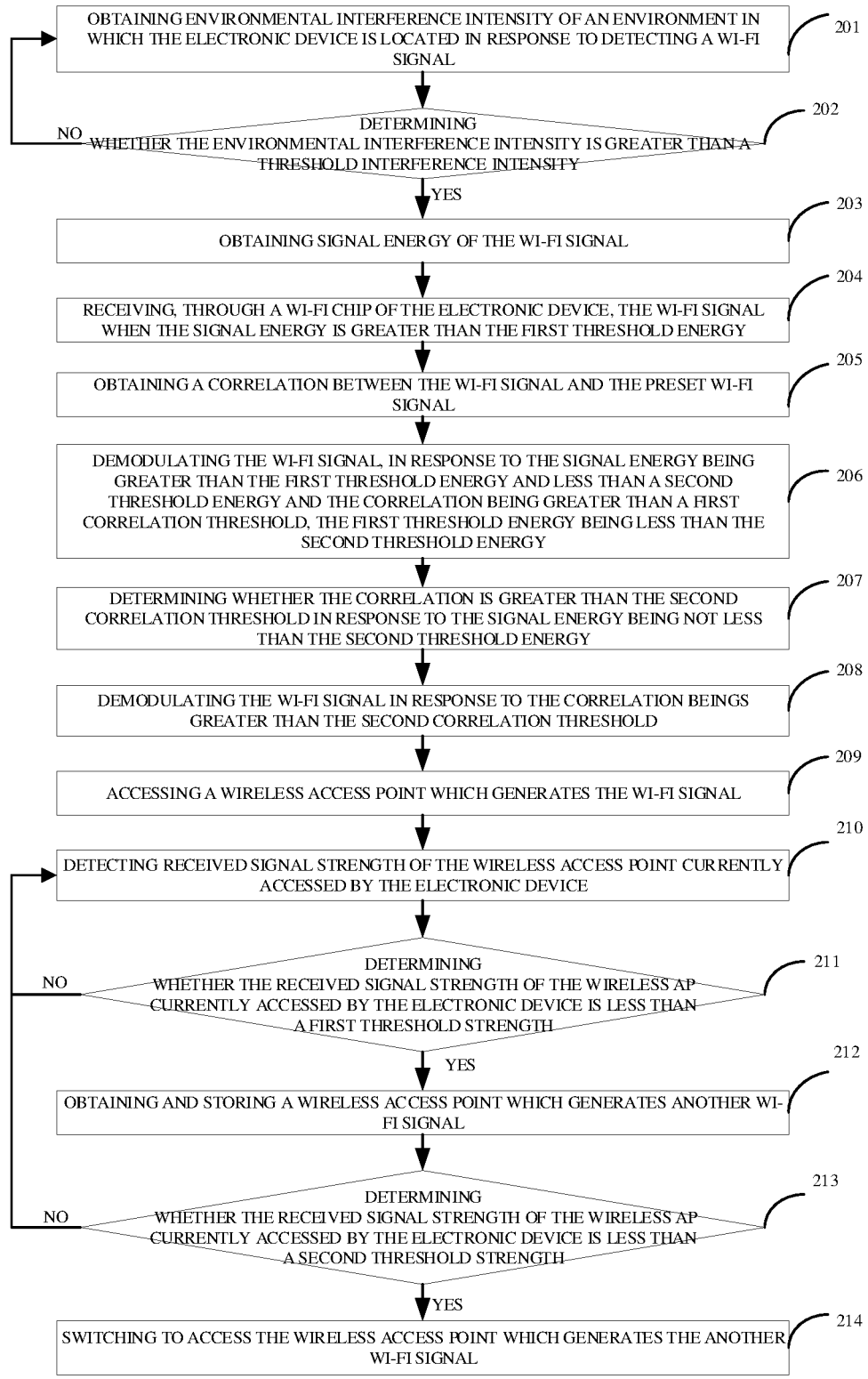
FIG. 2 is a schematic flowchart illustrating a method for Wi-Fi network processing according to other implementations of the present disclosure.

Now reference is made to FIG. 2, which is a schematic flowchart illustrating a method for Wi-Fi network processing according to other implementations of the present disclosure. The method is applied to the above electronic device. The flowchart as illustrated in FIG. 1 will be described in detail below, and the method for Wi-Fi network processing can specifically include following operations at block 201 to block 214.

At block 201, environmental interference intensity of an environment in which the electronic device is located is obtained in response to detecting, by the electronic device, a Wi-Fi signal.

When the electronic device detects the Wi-Fi signal, the environmental interference intensity of the environment in which the electronic device is located can be detected, so as to weaken influence of environmental parameters on Wi-Fi performance of the electronic device. Specifically, the environmental parameters of the environment may include environmental temperature, environmental humidity, the number of Wi-Fi signals and other parameters that affect the Wi-Fi performance of the electronic device. The environmental interference intensity of the environment is calculated based on the obtained environmental parameters.

At block 202, whether the environmental interference intensity is greater than a threshold interference intensity is determined.

In this implementation, the threshold interference intensity is set in the electronic device, which can be configured as a basis for determining the obtained environmental interference intensity. The threshold interference intensity can be automatically set by the electronic device, manually set by a user of the electronic device, or transmitted to the electronic device after being set by the server, which is not limited herein. Specifically, after obtaining the environmental interference intensity of the environment in which the electronic device is located, the environmental interference intensity is compared with the threshold interference intensity to determine whether the environmental interference intensity is greater than the threshold interference intensity. In response to the environmental interference intensity being greater than the threshold interference intensity, it is indicated that the environmental interference intensity has reached a level that can affect the Wi-Fi performance of the electronic device, and the Wi-Fi signals can be processed accordingly. In response to the environmental interference intensity being not greater than the threshold interference intensity, it is indicated that the environmental interference intensity does not reach the level that affects the Wi-Fi performance of the electronic device, and the influence of the environmental parameters on the Wi-Fi performance of the electronic device can be ignored.

At block 203, in response to the environmental interference intensity being greater than the threshold interference intensity, the signal energy of the Wi-Fi signal is obtained.

In this implementation, in response to the environmental interference intensity being determined to be greater than the threshold interference intensity, it is indicated that the environmental parameters of the environment in which the electronic device is located have already affected the Wi-Fi performance of the electronic device, so the signal energy of the Wi-Fi signal can be obtained so as to select the signal energy of the Wi-Fi signal to weaken the influence of the environmental parameters.

At block 204, in response to the signal energy being greater than a first threshold energy, the Wi-Fi signal is received through a Wi-Fi chip of the electronic device.

In response to the signal energy of the Wi-Fi signal being greater than the first threshold energy, the Wi-Fi chip of the electronic device will be triggered to receive and process the Wi-Fi signal.

At block 205, a correlation degree between the Wi-Fi signal and a preset Wi-Fi signal is obtained.

For detailed descriptions of operations At block 205, reference can be made to operations At block 102, which will not be repeated here.

Figure 3:
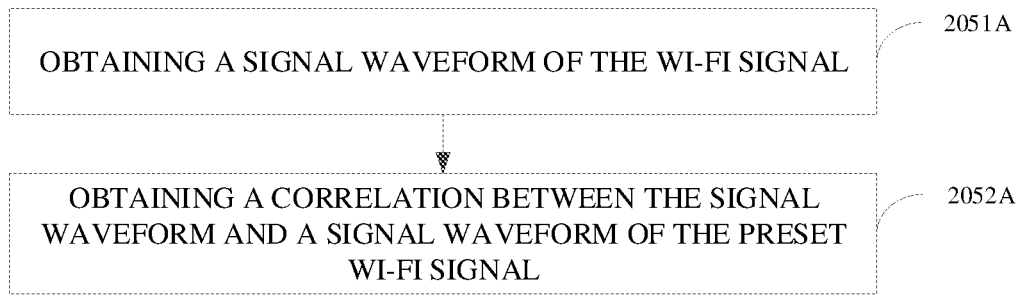
FIG. 3 is a schematic flowchart illustrating an implementation of operations at block 205 of the method for Wi-Fi network processing illustrated in FIG. 2 of the present disclosure.

Now reference is made to FIG. 3, which is a schematic flowchart illustrating an implementation of operations At block 205 of the method for Wi-Fi network processing illustrated in FIG. 2 of present disclosure. The flow illustrated in FIG. 3 will be described in detail below, and the method can specifically include following operations at block 2051A to block 2052A.

At block 2051A, a signal waveform of the Wi-Fi signal is obtained.

At block 2052A, a correlation degree between the signal waveform and a preset signal waveform of the preset Wi-Fi signal is obtained.

The correlation degree between the Wi-Fi signal and the preset Wi-Fi signal may include the correlation degree between the signal waveform of the Wi-Fi signal and the preset signal waveform of the preset Wi-Fi signal. The preset signal waveform of the preset Wi-Fi signal is recorded in the Wi-Fi chip of the electronic device. The signal waveform refers to a shape, a form, or the like of the signal which is used to express a movement of a wave of the signal in physical medium, and can also be an abstract expression form of other physical quantities. In this implementation, after the electronic device obtains the Wi-Fi signal, the signal waveform of the Wi-Fi signal is extracted and compared with the preset signal waveform of the preset Wi-Fi signal to obtain the correlation degree between the signal waveform and the preset signal waveform, which is taken as the correlation degree between the Wi-Fi signal and the preset Wi-Fi signal.

Figure 4:
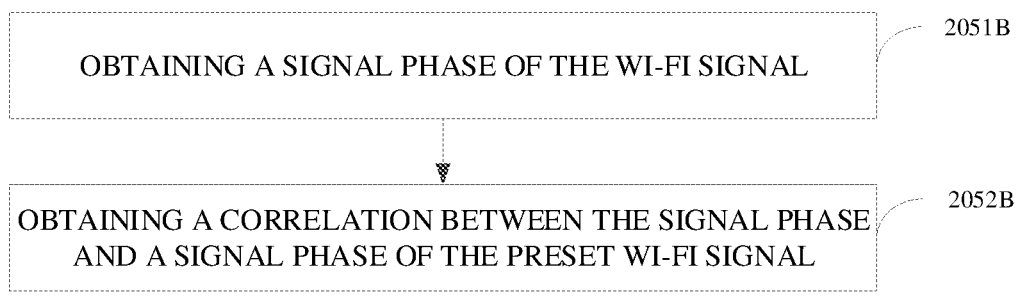
FIG. 4 is a schematic flowchart illustrating another implementation of operations at block 205 of the method for Wi-Fi network processing illustrated in FIG. 2 of the present disclosure.

Now reference is made to FIG. 4, which is a schematic flowchart illustrating another implementation of operations at block 205 of the method for Wi-Fi network processing illustrated in FIG. 2 of the present disclosure. The flow illustrated in FIG. 4 will be described in detail below, and the method can specifically include following steps block 2051B to block 2052B.

At block 2051B, a signal phase of the Wi-Fi signal is obtained.

At block 2052B, a correlation degree between the signal phase and a preset signal phase of the preset Wi-Fi signal is obtained.

As an implementation, the correlation degree between the Wi-Fi signal and the preset Wi-Fi signal may also include the correlation degree between the signal phase of the Wi-Fi signal and the preset signal phase of the preset Wi-Fi signal. The preset signal phase of the preset Wi-Fi signal is recorded in the Wi-Fi chip of the electronic device. The signal phase reflects a position of a wave of the signal in a cycle at a specific time, which is a scale of whether the wave is at a peak, a trough, or a certain point between the peak and the trough. In this implementation, after the electronic device obtains the Wi-Fi signal, the signal phase of the Wi-Fi signal is extracted and compared with the preset signal phase of the preset Wi-Fi signal to obtain the correlation degree between the signal phase and the preset signal phase, which is taken as the correlation degree between the Wi-Fi signal and the preset Wi-Fi signal.

At block 206, in response to the signal energy being greater than the first threshold energy and less than a second threshold energy and the correlation degree being greater than the first correlation degree threshold, the Wi-Fi signal is demodulated. The first threshold energy is less than the second threshold energy.

At block 207, in response to the signal energy being not less than the second threshold energy, whether the correlation degree being greater than the second correlation degree threshold is determined.

At block 208, in response to the correlation degree being greater than the second correlation degree threshold, the Wi-Fi signal is demodulated.

For detailed descriptions of operations at block 206 to block 208, reference can be made to operations at block 103 to block 104, which will not be repeated here.

Figure 5:
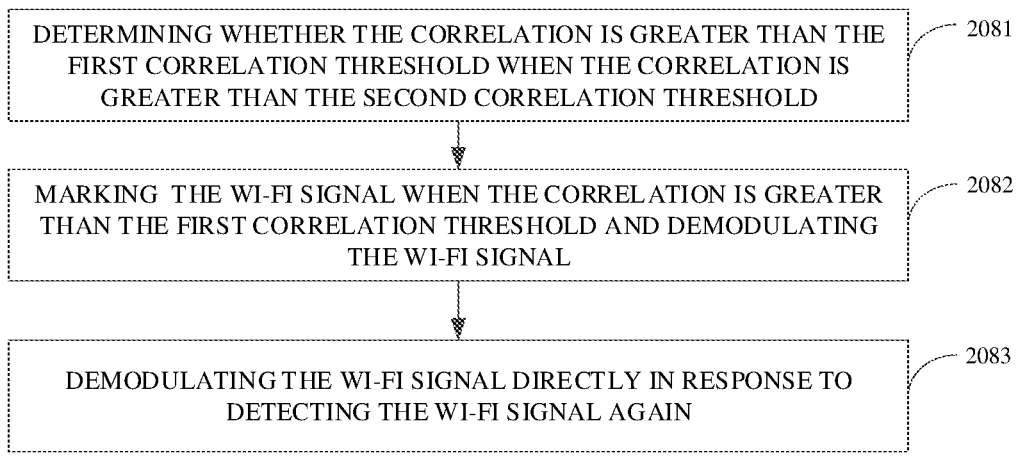
FIG. 5 is a schematic flowchart illustrating operations at block 208 of the method for Wi-Fi network processing illustrated in FIG. 2 of the present disclosure.

Now reference is made to FIG. 5, which is a schematic flowchart illustrating operations at block 208 of the method for Wi-Fi network processing shown in FIG. 2 of the present disclosure. The flowchart shown in FIG. 5 will be described in detail below, and the method can specifically include following operations at block 2081 to block 2083.

At block 2081, in response to the correlation degree being greater than the second correlation degree threshold, whether the correlation degree is greater than the first correlation degree threshold is determined.

As an implementation, if the signal energy of the Wi-Fi signal is not less than the second threshold energy and the correlation degree between the Wi-Fi signal and the preset Wi-Fi signal is greater than the second correlation degree threshold, whether the correlation degree between the Wi-Fi signal and the preset Wi-Fi signal is greater than the first correlation degree threshold can be further determined. Since the first correlation degree threshold is greater than the second correlation degree threshold, the correlation degree between the Wi-Fi signal and the preset Wi-Fi signal being greater than the first correlation degree threshold indicates better quality, comparing with the correlation degree between the Wi-Fi signal and the preset WIFI signal being greater than the second correlation degree threshold.

At block 2082, the Wi-Fi signal is marked in response to the correlation degree being greater than the first correlation degree threshold, and is demodulated.

When a determination result is that the correlation degree between the Wi-Fi signal and the preset Wi-Fi signal is greater than the first correlation degree threshold, it is indicated that the correlation degree between the Wi-Fi signal and the preset Wi-Fi signal is stronger, and meanwhile, because the signal energy of the Wi-Fi signal is greater than the second energy threshold, namely, the signal energy of the Wi-Fi signal is stronger, it can be determined that the signal quality of the Wi-Fi signal is very good, and thus, the Wi-Fi signal can be demodulated and marked at the same time. The marking indicates that the Wi-Fi signal can be taken as a preferred Wi-Fi signal. For example, the marking can include a character marking, a text marking, and the like, which is not limited herein.

At block 2083, the Wi-Fi signal is directly demodulated in response to detecting the Wi-Fi signal again.

Further, since the Wi-Fi signal carries a mark, when the electronic device detects the Wi-Fi signal again, the mark carried by the Wi-Fi signal can be obtained so as to determine that the signal quality of the Wi-Fi signal is very good, without the determining of the signal energy and the correlation degree with the preset Wi-Fi signal. As such, the Wi-Fi signal can be directly demodulated.

Figure 6:
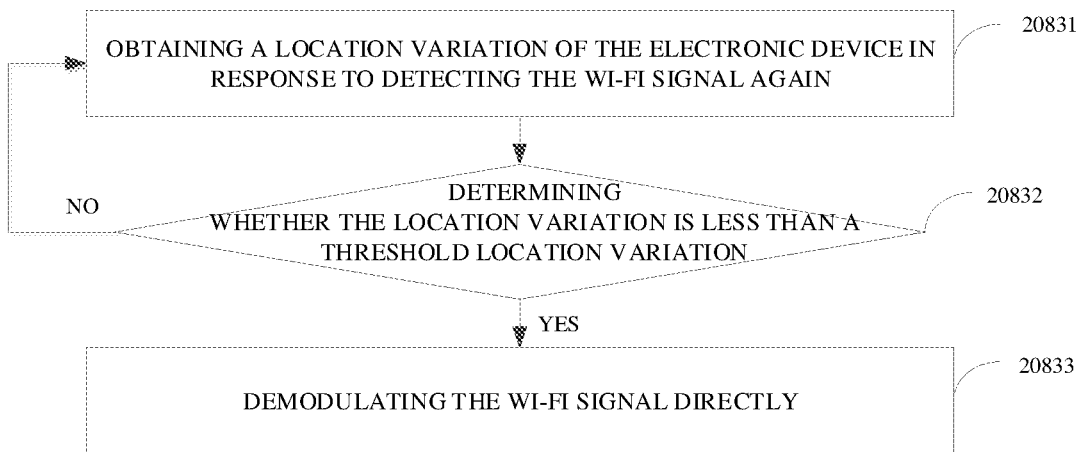
FIG. 6 is a schematic flowchart illustrating operations at block 2083 of the method for Wi-Fi network processing illustrated in FIG. 5 of the present disclosure.

Now reference is made to FIG. 6, which is a schematic flowchart illustrating operations at block 2083 of the method for Wi-Fi network processing illustrated in FIG. 5 of the present disclosure. The flow illustrated in FIG. 6 will be described in detail below, and the method can specifically include following operations at block 20831 to block 20833.

At block 20831, a location variation of the electronic device is obtained in response to detecting the Wi-Fi signal again.

A coverage of the Wi-Fi signal is limited, so the Wi-Fi signals detected by the electronic device in different locations are different. For example, when the electronic device is close to a wireless AP which generates the Wi-Fi signal, the signal energy of the Wi-Fi signal is strongest, and in the process of the electronic device moving from near to far away from the wireless AP, the signal energy of the Wi-Fi signal continuously decays or even decays to zero. Therefore, when the electronic device detects the Wi-Fi signal again, the location variation of the electronic device can be obtained. The location variation is a distance between a location where the electronic device detects the Wi-Fi signal again and a location where the electronic device marks the Wi-Fi signal.

At block 20832, whether the location variation is less than a threshold location variation is determined.

Further, the threshold location variation is set in the electronic device, which can be configured as a basis for determining the location variation. For example, the threshold location variation can be automatically set in advance by the electronic device or transmitted to the electronic device after being preset by the server, which is not limited herein. The threshold location variation can be set based on the signal quality of the Wi-Fi signal. The better the signal quality of the Wi-Fi signal is, the larger the threshold location variation can be set, the worse the signal quality of the Wi-Fi signal is, the less the threshold location variation can be set. Therefore, in this implementation, after obtaining the location variation of the electronic device, the location variation is compared with the threshold location variation to determine whether the location variation is less than the threshold location variation.

At block 20833, the Wi-Fi signal is directly demodulated in response to the location variation being less than the threshold location variation.

In response to the location variation being less than the threshold location variation, it is indicated that the signal quality of the Wi-Fi signal detected by the electronic device at the location is attenuated less, that is, the signal energy of the Wi-Fi signal and the correlation degree with the preset Wi-Fi signal are still very strong, so the Wi-Fi signal can be directly demodulated. On the contrary, in response to the location variation being not less than the threshold location variation, it is indicated that the signal quality of the Wi-Fi signal detected by the electronic device at the location is attenuated more, that is, the signal energy of the Wi-Fi signal and the correlation degree with the preset Wi-Fi signal may be poor, and thus the signal energy of the detected Wi-Fi signal and the correlation degree between the Wi-Fi signal and the preset Wi-Fi signal can be detected and determined again.

Figure 7:
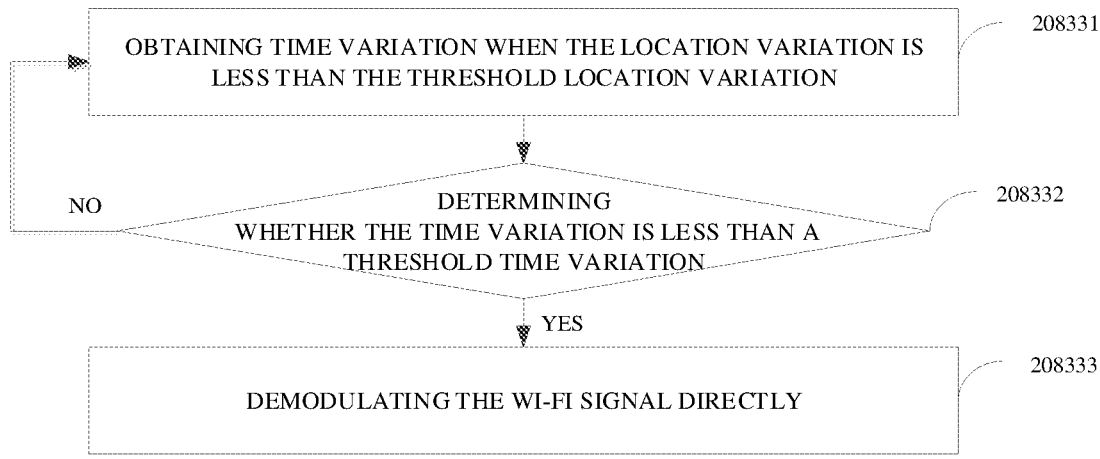
FIG. 7 is a schematic flowchart illustrating operations at block 20833 of the method for Wi-Fi network processing illustrated in FIG. 6 of the present disclosure.

Now reference is made to FIG. 7, which is a schematic flowchart illustrating operations at block 20833 of the method for Wi-Fi network processing shown in FIG. 6 of the present disclosure. The flow illustrated in FIG. 7 will be described in detail below, and the method can specifically include following operations at block 208331 to block 208333.

At block 208331, in response to the location variation being less than the threshold location variation, a time variation is obtained.

The signal quality of the Wi-Fi signal may change with time. For example, the electronic device detects that the signal quality of the Wi-Fi signal is good at 9:00 a.m., but may detect that the signal quality deteriorates at 8:00 p.m., so the signal quality of the Wi-Fi signal may remain unchanged or change in a small range for a period of time. In this implementation, in response to the location variation being determined to be less than the threshold location variation, the time variation can be obtained. The time variation is a difference between the time when the electronic device detects the Wi-Fi signal again and the time when the electronic device marks the Wi-Fi signal.

At block 208332, whether the time variation is less than a threshold time variation is determined.

Further, a threshold time variation is set in the electronic device, which can be configured as a basis for determining the time variation. As a solution, the threshold time variation can be automatically set in advance by the electronic device or transmitted to the electronic device after being preset by the server, which is not limited here. For example, the threshold time variation can be half an hour, one hour or the like. Therefore, in this implementation, after obtaining the time variation, the time variation is compared with the threshold time variation to determine whether the time variation is less than the threshold time variation.

At block 208333, in response to the time variation being less than the threshold time variation, the Wi-Fi signal is directly demodulated.

In response to the time variation being less than the threshold time variation, it is indicated that the signal quality of the Wi-Fi signal may remain unchanged or change in a small range, that is, the signal energy of the Wi-Fi signal and the correlation degree with the preset Wi-Fi signal are still very strong, so the Wi-Fi signal can be directly demodulated. On the contrary, in response to the time variation being not less than the threshold time variation, it is indicated that the signal quality of the Wi-Fi signal may change greatly, that is, the correlation degree between the signal energy of the Wi-Fi signal and/or the preset Wi-Fi signal may be poor, and thus the signal energy of the detected Wi-Fi signal and the correlation degree between the Wi-Fi signal and the preset Wi-Fi signal can be detected and determined again.

At block 209, a wireless AP which generates the Wi-Fi signal is accessed.

Further, after the Wi-Fi signal is demodulated, information carried by the Wi-Fi signal can be obtained, for example, a service set identifier (SSID) and a password of the Wi-Fi signal can be obtained to access the wireless AP which generates the Wi-Fi signal.

At block 910, received signal strength of the wireless AP currently accessed by the electronic device is detected.

As a solution, the electronic device may be equipped with a built-in Wi-Fi receiving apparatus, which may be configured to receive a Wi-Fi signal and obtain a received signal strength indication (RSSI) based on the signal strength of the received Wi-Fi signal, that is, to obtain the received signal strength of the wireless AP currently accessed by the electronic device. The received signal strength is a relative value indicating the signal strength of the received Wi-Fi signal, which can be obtained by calculating signal power of the Wi-Fi signal.

At block 211, whether the received signal strength of the wireless AP currently accessed by the electronic device is less than a first threshold strength is determined.

Further, the first threshold strength is set in the electronic device, which can be configured as a basis for determining the received signal strength of the wireless AP currently accessed by the electronic device. Specifically, after the electronic device obtains the received signal strength of the wireless AP currently accessed by the electronic device, the received signal strength of the wireless AP currently accessed by the electronic device is compared with the first threshold strength to determine whether the received signal strength of the wireless AP currently accessed by the electronic device is less than the first threshold strength. In this implementation, the first threshold strength can be configured as a basis for determining whether the received signal strength of the wireless AP currently accessed by the electronic device is poor.

At block 212, in response to the received signal strength of the wireless AP currently accessed by the electronic device being less than the first threshold strength, a wireless AP which generates another Wi-Fi signal is obtained and stored. Received signal strength of the wireless AP which generates the another Wi-Fi signal is greater than the received signal strength of the wireless AP currently accessed by the electronic device.

When the received signal strength of the wireless AP currently accessed by the electronic device is determined to be less than the first threshold strength, it is indicated that the Wi-Fi signal of the wireless AP currently accessed by the electronic device is poor, which may result in poor network status of the electronic device. Therefore, the electronic device can be controlled to rescan Wi-Fi signals in the environment where the electronic device is located to obtain the wireless AP which generates the another Wi-Fi signal and temporarily store it in the electronic device. The received signal strength of the wireless AP which generates the another Wi-Fi signal is greater than the received signal strength of the wireless AP currently accessed by the electronic device.

At block 213, whether the received signal strength of the wireless AP currently accessed by the electronic device is less than a second threshold strength is determined. The second threshold strength is less than the first threshold strength.

Further, a second threshold strength is further set in the electronic device, which is less than the first threshold strength. In this implementation, the second threshold strength can be configured as a basis for determining whether the received signal strength of the wireless AP currently accessed by the electronic device is very poor. Therefore, in this implementation, after determining that the received signal strength of the wireless AP currently accessed by the electronic device is less than the first threshold strength, the received signal strength of the wireless AP currently accessed by the electronic device is compared with the second threshold strength to determine whether the received signal strength of the wireless AP currently accessed by the electronic device is less than the second threshold strength.

At block 214, in response to the received signal strength of the wireless AP currently accessed by the electronic device being less than the second threshold strength, the electronic device is controlled to be switched to access a wireless AP which generates the another Wi-Fi signal.

When it is determined that the received signal strength of the wireless AP currently accessed by the electronic device is less than the second threshold strength, it is indicated that the Wi-Fi signal of the wireless AP currently accessed by the electronic device is very poor, which may result in poor network status of the electronic device or even being unable to access the network. Therefore, the electronic device can be controlled to be switched to the wireless AP with better received signal strength, that is, to the wireless AP which generates the another Wi-Fi signal.

Figure 8:
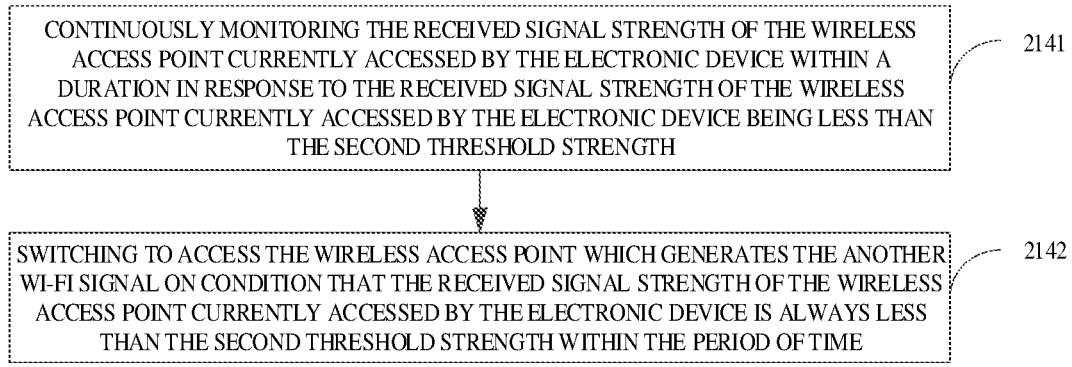
FIG. 8 is a schematic flowchart illustrating operations at block 214 of the method for Wi-Fi network processing illustrated in FIG. 2 of the present disclosure.

Now reference is made to FIG. 8, which is a schematic flowchart illustrating operations at block 214 of the method for Wi-Fi network processing illustrated in in FIG. 2 of the present disclosure. The flow illustrated in FIG. 8 will be described in detail below, and the method can specifically include following operations at block 2141 to block 2142.

At block 2141, in response to the received signal strength of the wireless AP currently accessed by the electronic device being less than the second threshold strength, the received signal strength of the wireless AP currently accessed by the electronic device is continuously monitored within a duration.

When the received signal strength of the wireless AP currently accessed by the electronic device is interfered by the environment, the electronic device may be disconnected from the network or the received signal strength may decrease. However, after a short time, the received signal strength of the wireless AP currently accessed by the electronic device may recover. Therefore, in this implementation, the received signal strength of the wireless AP currently accessed by the electronic device may be continuously monitored within a preset duration, and a time length of the duration is not limited herein.

At block 2142, in response to the received signal strength of the wireless AP currently accessed by the electronic device being always less than the second threshold strength within the preset period of time, the electronic device is controlled to be switched to access the wireless AP which generates the another Wi-Fi signal.

When it is continuously detected that the received signal strength of the wireless AP currently accessed by the electronic device is always less than the second threshold strength within the preset period of time, it is indicated that the wireless AP currently accessed by the electronic device cannot restore to be normal in a short time, and thus the electronic device can be controlled to be switched to access the wireless AP which generates the another Wi-Fi signal.

According to the method for Wi-Fi network processing provided in implementations of the present disclosure, in response to detecting the Wi-Fi signal, the interference intensity of the environment in which the electronic device is located is obtained. In response to the environmental interference intensity being greater than the threshold interference intensity, the signal energy of the Wi-Fi signal is obtained. In response to the signal energy being greater than the first threshold energy, the Wi-Fi signal is received through the Wi-Fi chip of the electronic device, and the correlation degree between the Wi-Fi signal and the preset Wi-Fi signal can be obtained. In response to the signal energy being greater than the first threshold energy and less than the second threshold energy, the Wi-Fi signal is demodulated, the first threshold energy being less than the second threshold energy. In response to the signal energy being not less than the second threshold energy, whether the correlation degree being greater than the second correlation degree threshold is determined, and in response to the correlation degree being greater than the second correlation degree threshold, the Wi-Fi signal is demodulated. Then the wireless AP which generates the Wi-Fi signal is accessed, and the received signal strength of the wireless AP currently accessed by the electronic device is detected. In response to the received signal strength of the wireless AP currently accessed by the electronic device being less than a first threshold strength, the wireless AP which generates the another Wi-Fi signal is obtained and stored. Whether the received signal strength of the wireless AP currently accessed by the electronic device is less than the second threshold strength is determined, the second intensity threshold being less than the first intensity threshold. In response to the received signal intensity of the wireless AP currently accessed by the electronic device being less than the second intensity threshold, the electronic device is controlled to be switched to access the wireless AP which generates the another Wi-Fi signal. Compared with the method for Wi-Fi network processing illustrated in FIG. 1, in this implementation, the signal energy of the Wi-Fi signal is obtained in response to the environmental interference intensity being greater than the threshold interference intensity, so as to reduce the power consumption of the electronic device; the electronic device is switched to access another wireless AP when the received signal intensity of the wireless AP accessed by the electronic device is less than the second intensity threshold, so as to improve the Wi-Fi performance.

Figure 9:
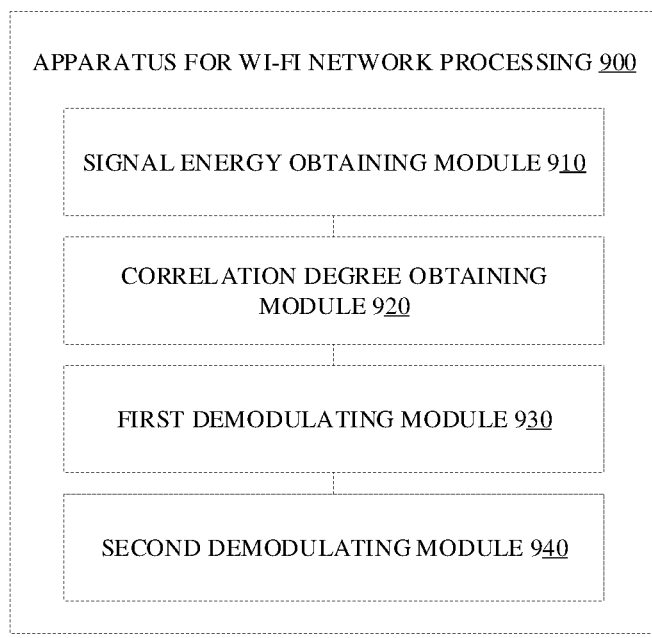
FIG. 9 is a block diagram illustrating modules of an apparatus for Wi-Fi network processing according to implementations of the present disclosure.

Now reference is made to FIG. 9, which is a block diagram illustrating modules of an apparatus for Wi-Fi network processing according to implementations of the present disclosure. The apparatus for Wi-Fi network processing 900 is applied to the above-mentioned electronic device, and the block diagram illustrated in FIG. 9 will be described below. The apparatus for Wi-Fi network processing 900 includes a signal energy obtaining module 910, a correlation degree obtaining module 920, a first demodulating module 930, and a second demodulating module 940.

The signal energy obtaining module 910 is configured to obtain signal energy of a Wi-Fi signal in response to detecting the Wi-Fi signal. As an implementation, the signal energy obtaining module 910 further includes an environmental interference intensity obtaining submodule, an environmental interference intensity determining submodule, and a signal energy obtaining submodule.

The environmental interference intensity obtaining submodule is configured to obtain an environmental interference intensity of an environment in which the electronic device is located in response to detecting the Wi-Fi signal.

The environmental interference intensity determining submodule is configured to determine whether the environmental interference intensity is greater than a threshold interference intensity.

The signal energy obtaining submodule is configured to obtain the signal energy of the Wi-Fi signal in response to the environmental interference intensity being greater than the threshold interference intensity.

The correlation degree obtaining module 920 is configured to obtain a correlation degree between the Wi-Fi signal and a preset Wi-Fi signal in response to the signal energy being greater than a first threshold energy. Further, the correlation degree obtaining module 920 includes a Wi-Fi signal receiving submodule and a correlation degree obtaining submodule.

The Wi-Fi signal receiving submodule is configured to receive the Wi-Fi signal through a Wi-Fi chip of the electronic device in response to the signal energy being greater than the first threshold energy.

The correlation degree obtaining submodule is configured to obtain the correlation degree between the Wi-Fi signal and the preset Wi-Fi signal. Further, the correlation degree obtaining submodule comprises a signal waveform obtaining unit, a first correlation degree obtaining unit, a signal phase obtaining unit, and a second correlation degree obtaining unit.

The signal waveform obtaining unit is configured to obtain a signal waveform of the Wi-Fi signal.

The first correlation degree obtaining unit is configured to obtain a correlation degree between the signal waveform and a signal waveform of the preset Wi-Fi signal.

The signal phase obtaining unit is configured to obtain a signal phase of the Wi-Fi signal.

The second correlation degree obtaining unit is configured to obtain a correlation degree between the signal phase and a signal phase of the preset Wi-Fi signal.

The first demodulating module 930 is configured to demodulate the Wi-Fi signal, in response to the signal energy being greater than the first threshold energy and less than a second threshold energy and the correlation degree being greater than a first correlation degree threshold, where the first threshold energy is less than the second threshold energy.

The second demodulating module 940 is configured to demodulate the Wi-Fi signal, in response to the signal energy being not less than the second threshold energy and the correlation degree being greater than a second correlation degree threshold. The first correlation degree threshold is greater than the second correlation degree threshold. Further, the second demodulation module 940 includes a determining submodule and a demodulation submodule, The determining submodule is configured to determine whether the correlation degree is greater than the second correlation degree threshold in response to the signal energy being not less than the second threshold energy.

The demodulating submodule is configured to demodulate the Wi-Fi signal in response to the correlation degree being greater than the second correlation degree threshold. Further, the Wi-Fi signal demodulation submodule comprises a determining unit, a marking unit, and a demodulation unit.

The determining unit is configured to determine whether the correlation degree is greater than the first correlation degree threshold in response to the correlation degree being greater than the second correlation degree threshold.

The marking unit is configured to mark the Wi-Fi signal in response to the correlation degree being greater than the first correlation degree threshold and demodulate the Wi-Fi signal.

The demodulation unit is configured to demodulate the Wi-Fi signal directly in response to detecting the Wi-Fi signal again. Further, the demodulation unit includes a location variation obtaining subunit, a location variation determining subunit, and a demodulation subunit.

The location variation obtaining subunit is configured to obtain a location variation of the electronic device in response to detecting the Wi-Fi signal again.

The location variation determining subunit is configured to determine whether the location variation is less than a threshold location variation.

A demodulation subunit is configured to demodulate the Wi-Fi signal directly in response to the location variation being less than the threshold location variation. Further, the demodulation subunit is specifically configured to obtain a time variation in response to the location variation being less than the threshold location variation; to determine whether the time variation is less than the threshold time variation; directly demodulate the Wi-Fi signal in response to the time variation being less than the threshold time variation.

Further, the apparatus 900 for Wi-Fi network processing further includes a Wi-Fi signal filtering module, a wireless AP accessing module, a received signal strength detecting module, a first received signal strength determining module, a wireless AP obtaining module, a second received signal strength determining module, and a wireless AP switching module.

The Wi-Fi signal filtering module is configured to filter out the Wi-Fi signal in response to the signal energy being not greater than the first threshold energy.

The wireless AP access module is configured to access the wireless AP which generates the Wi-Fi signal.

The received signal strength detecting module is configured to detect the received signal strength of the wireless AP currently accessed by the electronic device.

The first received signal strength determining module is configured to determine whether the received signal strength of the wireless AP currently accessed by the electronic device is less than a first threshold strength.

The wireless AP obtaining module is configured to obtain and store a wireless AP which generates another Wi-Fi signal in response to the received signal strength of the wireless AP currently accessed by the electronic device being less than the first threshold strength. Received signal strength of the wireless AP which generates the another Wi-Fi signal is greater than the received signal strength of the wireless AP currently accessed by the electronic device.

The second received signal strength determining module is configured to determine whether the received signal strength of the wireless AP currently accessed by the electronic device is less than a second threshold strength, the second threshold strength being less than the first threshold strength.

The wireless AP switching module is configured to control the electronic device to be switched to access the wireless AP which generates the another Wi-Fi signal in response to the received signal strength of the wireless AP currently accessed by the electronic device being less than the second threshold strength. Further, the wireless AP switching module includes a received signal strength monitoring submodule and a wireless AP switching submodule.

The received signal strength monitoring submodule is configured to continuously monitor the received signal strength of the wireless AP currently accessed by the electronic device within a duration in response to the received signal strength of the wireless AP currently accessed by the electronic device being less than the second threshold strength.

The wireless AP switching submodule is configured to control the electronic device to access the wireless AP which generates the another Wi-Fi signal on condition that the received signal strength of the wireless AP currently accessed by the electronic device is always less than the second threshold strength within the period of time.

It can be clearly understood by those skilled in the art that for the convenience and conciseness of description, for the specific working processes of the apparatus and modules described above, reference can be made to corresponding processes in the aforementioned method implementations, which will not be described in detail here.

In several implementations provided in this application, the coupling between modules can be electrical, mechanical or in other forms.

In addition, respective functional modules in each implementation of this application can be integrated into one processing module, or each module can exist physically alone, or two or more modules can be integrated into one module. The above integrated modules can be implemented in a form of hardware or software functional modules.

Figure 10:
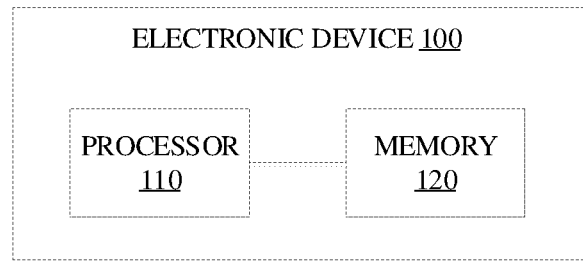
FIG. 10 is a block diagram illustrating an electronic device for executing a method for Wi-Fi network processing according to implementations of the present disclosure.

Now reference is made to FIG. 10, which is a structural block diagram of an electronic device 100 provided in implementations of the present disclosure. The electronic device 100 can be a smart phone, a tablet computer, an e-book or other electronic devices capable of running applications. The electronic device 100 in implementations the present disclosure may include at least one of the following: a processor 110, a memory 120, and one or more application programs. The one or more application programs may be stored in the memory 120 and configured to be executed by the one or more processors 110, and the one or more programs are configured to execute the method as described in the foregoing method implementations.

The processor 110 may include one or more processing cores. The processor 110 is configured to connect various parts in the entire electronic device 100 using various interfaces and lines, and to execute various functions of the electronic device 100 and process data by running or executing instructions, programs, code sets, or instruction sets stored in the memory 120, and calling data stored in the memory 120. For example, the processor 110 can be implemented in at least one of following hardware forms: digital signal processing (DSP), field programmable gate array (FPGA), and programmable logic array (PLA). The processor 110 may integrate one or a combination of several of a central processing unit (CPU), a graphics processing unit (GPU), and a modem. The CPU is configured to mainly handle an operating system, a user interface, and an application program, etc; the GPU is configured to render and draw display content; and the modem is configured to handle wireless communication. It can be understood that the above-mentioned modem can also be realized by a communication chip alone, without being integrated into the processor 110.

The memory 120 may include a random access memory (RAM) or a read-only memory. The memory 120 may be configured to store instructions, programs, codes, code sets, or instruction sets. The memory 120 may include a program storing area and a data storing area. The program storing area may store instructions for implementing an operating system, instructions for implementing at least one function (such as a touch function, a sound playing function, an image playing function, etc.), instructions for implementing various method implementations described above, and the like. The data storing area may also store data created by the terminal 100 in use (such as a phonebook, audio and video data, chat record data, etc.)

Figure 11:
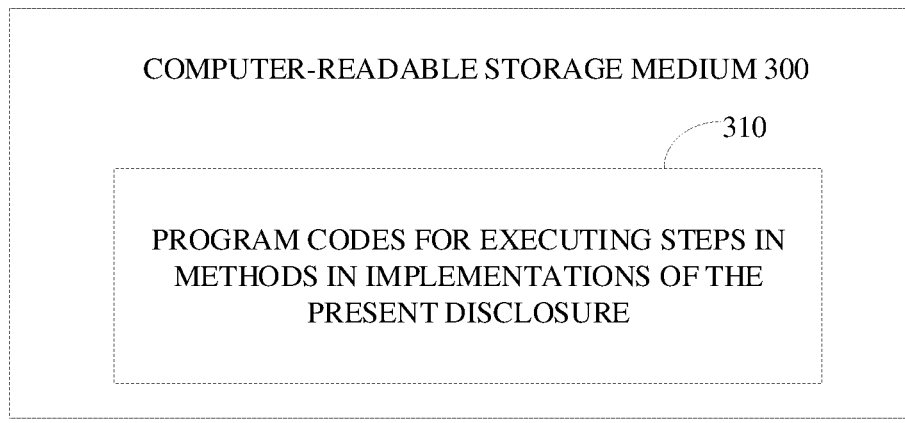
FIG. 11 is a block diagram illustrating a storage unit for storing or carrying program codes for implementing a method for Wi-Fi network processing according to implementations of the present disclosure.

Now reference is made to FIG. 11, which is a structural block diagram of a computer readable storage medium provided in implementations of the present disclosure. The computer readable medium 300 stores program codes, which can be called by a processor to execute the methods described in the above method implementations.

The computer readable storage medium 300 may be an electronic memory such as flash memory, electrically erasable programmable read-only memory (EEPROM), erasable programmable read-only memory (EPROM), hard disk, or read-only memory (ROM). For example, the computer-readable storage medium 300 includes a non-transitory computer-readable storage medium. The computer-readable storage medium 300 has a storage space of program codes 310 for executing any method step in the above methods. These program codes can be read out from or written into one or more computer program products. The program codes 310 may be compressed in an appropriate form, for example.

Implementations further provide a computer program product. The computer program product includes a non-transitory computer-readable storage medium storing a computer program. The computer program is operable to cause the computer to execute all or part of operations of the method of the above. The computer program product may be a software installation package.

To sum up, in the method and apparatus for Wi-Fi network processing, the electronic device, and the storage medium according to implementation of the present disclosure, in response to detecting the Wi-Fi signal, the signal energy of the Wi-Fi signal is obtained, and in response to the signal energy being greater than the first energy threshold, the correlation degree between the Wi-Fi signal and the preset Wi-Fi signal is obtained. In response to the signal energy being greater than the first energy threshold and less than the second energy threshold and the correlation degree being greater than the first correlation degree threshold, the Wi-Fi signal is demodulated, the first energy threshold being less than the second energy threshold. In response to the signal energy being not less than the second energy threshold and the correlation degree being greater than the second correlation degree threshold, the Wi-Fi signal is demodulated, the first correlation degree threshold being greater than the second correlation degree threshold. In this way, the signal energy of the Wi-Fi signal can be compared with the first energy threshold and the second energy threshold respectively, the correlation degree between the Wi-Fi signal and the preset Wi-Fi signal can be compared with the first correlation degree threshold and the second correlation degree threshold respectively, so as to select the Wi-Fi signal for demodulation, thus improving anti-interference ability and Wi-Fi performance of the electronic device.

Finally, it should be noted that the above implementations are intended to only illustrate the technical scheme of this application, but not to limit it; although the application has been described in detail with reference to the foregoing implementations, it should be understood for those of ordinary skilled in the art that the technical solutions described in the foregoing implementations can still be modified or some of the technical features can be replaced equivalently; and these modifications or substitutions do not drive essence of the corresponding technical solutions to deviate from the spirit and scope of the technical solutions of each implementation of this application.

What is claimed is:

1. A method for Wi-Fi network processing, for an electronic device and comprising:
    obtaining signal energy of a Wi-Fi signal in response to detecting the Wi-Fi signal;
    obtaining a correlation degree between the Wi-Fi signal and a preset Wi-Fi signal in response to the signal energy being greater than a first threshold energy;
    demodulating the Wi-Fi signal, in response to the signal energy being greater than the first threshold energy and less than a second threshold energy and the correlation degree being greater than a first threshold correlation degree, the first threshold energy being less than the second threshold energy; and
    demodulating the Wi-Fi signal, in response to the signal energy being not less than the second threshold energy and the correlation degree being greater than a second correlation degree threshold, the first correlation degree threshold being greater than the second threshold correlation degree.

2. The method of claim 1, wherein obtaining the correlation degree between the Wi-Fi signal and the preset Wi-Fi signal in response to the signal energy being greater than the first threshold energy comprises:
    receiving, through a Wi-Fi chip of the electronic device, the Wi-Fi signal in response to the signal energy being greater than the first threshold energy; and
    obtaining the correlation degree between the Wi-Fi signal and the preset Wi-Fi signal.

3. The method of claim 1, wherein obtaining the correlation degree between the Wi-Fi signal and the preset Wi-Fi signal comprises:
    obtaining a signal waveform of the Wi-Fi signal; and
    obtaining a correlation degree between the signal waveform and a preset signal waveform of the preset Wi-Fi signal.

4. The method of claim 1, wherein obtaining the correlation degree between the Wi-Fi signal and the preset Wi-Fi signal comprises:
    obtaining a signal phase of the Wi-Fi signal; and
    obtaining a correlation degree between the signal phase and a preset signal phase of the preset Wi-Fi signal.

5. The method of claim 1, further comprising:
    filtering out the Wi-Fi signal in response to the signal energy being not greater than the first threshold energy.

6. The method of claim 1, wherein demodulating the Wi-Fi signal, in response to the signal energy being not less than the second threshold energy and the correlation degree being greater than the second correlation degree threshold, the first correlation degree threshold being greater than the second threshold correlation degree comprises:

determining whether the correlation degree is greater than the second correlation degree threshold in response to the signal energy being not less than the second threshold energy; and demodulating the Wi-Fi signal in response to the correlation degree being greater than the second correlation degree threshold.

7. The method of claim 6, wherein demodulating the Wi-Fi signal in response to the correlation degree being greater than the second correlation degree threshold comprises:

determining whether the correlation degree is greater than the first correlation degree threshold in response to the correlation degree being greater than the second correlation degree threshold; and marking the Wi-Fi signal in response to the correlation degree being greater than the first correlation degree threshold and demodulating the Wi-Fi signal.

8. The method of claim 7, further comprising:

after marking the Wi-Fi signal in response to the correlation degree being greater than the first correlation degree threshold and demodulating the Wi-Fi signal, demodulating the Wi-Fi signal directly in response to detecting the Wi-Fi signal again.

9. The method of claim 8, wherein demodulating the Wi-Fi signal directly in response to detecting the Wi-Fi signal again comprises:

obtaining a location variation of the electronic device in response to detecting the Wi-Fi signal again; and demodulating the Wi-Fi signal directly in response to the location variation being less than a threshold location variation.

10. The method of claim 9, wherein demodulating the Wi-Fi signal directly in response to the location variation being less than the threshold location variation comprises:

obtaining a time variation in response to the location variation being less than the threshold location variation; and demodulating the Wi-Fi signal directly in response to the time variation being less than a threshold time variation.

11. The method of claim 1, further comprising:

after demodulating the Wi-Fi signal, accessing a wireless access point which generates the Wi-Fi signal.

12. The method of claim 11, further comprising:

after accessing the wireless access point which generates the Wi-Fi signal, detecting received signal strength of the wireless access point currently accessed by the electronic device; and storing a wireless access point which generates another Wi-Fi signal in response to the received signal strength of the wireless access point currently accessed by the electronic device being less than a first threshold strength, wherein received signal strength of the wireless access point which generates the another Wi-Fi signal is greater than the received signal strength of the wireless access point currently accessed by the electronic device.

13. The method of claim 12, further comprising:

after obtaining and storing the wireless access point which generates the another Wi-Fi signal in response to the received signal strength of the wireless access point currently accessed by the electronic device being less than the first threshold strength, switching to access the wireless access point which generates the another Wi-Fi signal in response to the received signal strength of the wireless access point currently accessed by the electronic device being less than a second threshold strength, the second threshold strength being less than the first threshold strength.

14. The method of claim 13, wherein switching to access the wireless access point which generates the another Wi-Fi signal in response to the received signal strength of the wireless access point currently accessed by the electronic device being less than the second threshold strength comprises:

continuously monitoring the received signal strength of the wireless access point currently accessed by the electronic device within a duration in response to the received signal strength of the wireless access point currently accessed by the electronic device being less than the second threshold strength; and switching to access the wireless access point which generates the another Wi-Fi signal on condition that the received signal strength of the wireless access point currently accessed by the electronic device is always less than the second threshold strength within the period of time.

15. The method of claim 1, wherein obtaining the signal energy of the Wi-Fi signal in response to detecting the Wi-Fi signal comprises:

obtaining environmental interference intensity of an environment in which the electronic device is located in response to detecting the Wi-Fi signal; and obtaining the signal energy of the Wi-Fi signal in response to the environmental interference intensity being greater than a threshold interference intensity.

16. An electronic device, comprising:

a memory;

one or more processors coupled with the memory; and one or more programs stored in the memory and configured to be executed by the one or more processors, wherein the one or more programs are configured to:

obtain signal energy of a Wi-Fi signal in response to detecting the Wi-Fi signal;

obtain a correlation degree between the Wi-Fi signal and a preset Wi-Fi signal in response to the signal energy being greater than a first threshold energy;

demodulate the Wi-Fi signal, in response to the signal energy being greater than the first threshold energy and less than a second threshold energy and the correlation degree being greater than a first threshold correlation degree, the first threshold energy being less than the second threshold energy; and demodulate the Wi-Fi signal, in response to the signal energy being not less than the second threshold energy and the correlation degree being greater than a second correlation degree threshold, the first correlation degree threshold being greater than the second threshold correlation degree.

17. The electronic device of claim 16, wherein in terms of obtaining the correlation degree between the Wi-Fi signal and the preset Wi-Fi signal, the one or more programs are configured to:

obtain a signal waveform of the Wi-Fi signal; and obtain a correlation degree between the signal waveform and a preset signal waveform of the preset Wi-Fi signal.

18. The electronic device of claim 16, wherein in terms of obtaining the correlation degree between the Wi-Fi signal and the preset Wi-Fi signal, the one or more programs are configured to:

obtain a signal phase of the Wi-Fi signal; and obtain a correlation degree between the signal phase and a preset signal phase of the preset Wi-Fi signal.

19. A non-transitory computer-readable storage medium for storing program codes, wherein the program codes are called by a processor to execute:
  obtaining signal energy of a Wi-Fi signal in response to detecting the Wi-Fi signal;
  obtaining a correlation degree between the Wi-Fi signal and a preset Wi-Fi signal in response to the signal energy being greater than a first threshold energy;
  demodulating the Wi-Fi signal, in response to the signal energy being greater than the first threshold energy and less than a second threshold energy and the correlation degree being greater than a first threshold correlation degree, the first threshold energy being less than the second threshold energy; and
  demodulating the Wi-Fi signal, in response to the signal energy being not less than the second threshold energy and the correlation degree being greater than a second correlation degree threshold, the first correlation degree threshold being greater than the second threshold correlation degree.

20. The non-transitory computer-readable storage medium of claim 19, wherein in terms of obtaining the signal energy of the Wi-Fi signal in response to detecting the Wi-Fi signal, the program codes are called by a processor to execute:
  obtaining environmental interference intensity of an environment in which an electronic device is located in response to detecting the Wi-Fi signal; and
  obtaining the signal energy of the Wi-Fi signal in response to the environmental interference intensity being greater than a threshold interference intensity.

* * * * *